Dec. 9, 1969    TAKASHI UMEMORI ET AL    3,483,471
THYRISTOR TURN-OFF TIME MEASURING SYSTEM WITH CATHODES
OF MEASURED AND CONTROLLED THYRISTORS CONNECTED
IN COMMON IN A FORWARD CURRENT CIRCUIT
Filed June 12, 1967

INVENTORS
*Takashi Umemori*
and
BY *Mitsuo Kawamura*

*Attorney*

United States Patent Office 3,483,471
Patented Dec. 9, 1969

3,483,471
THYRISTOR TURN-OFF TIME MEASURING SYSTEM WITH CATHODES OF MEASURED AND CONTROLLED THYRISTORS CONNECTED IN COMMON IN A FORWARD CURRENT CIRCUIT
Takashi Umemori, Kokubunji-shi, Tokyo, and Mitsuo Kawamura, Zushi-shi, Kanagawa-ken, Japan, assignors to Japanese National Railways, Marunouchi, Chiyoda-ku, Tokyo, Japan, a corporation of Japan
Filed June 12, 1967, Ser. No. 645,422
Claims priority, application Japan, June 14, 1966, 41/37,994
Int. Cl. G01r 27/26
U.S. Cl. 324—158　　　　　　　　　　　　　5 Claims

ABSTRACT OF THE DISCLOSURE

A system for measuring the turn-off time of a thyristor wherein cathodes of a controlling thyristor and a measured thyristor are connected in common in a forward current circuit. A commutating capacitor having a large discharging time constant is connected between the anodes of the controlling and measured thyristor. The measured thyristor is reverse biased by the capacitor after the capacitor is first charged from a reverse voltage charging circuit. Subsequently, a forward voltage is applied to the measured thyristor as the capacitor is charged from a forward voltage charging circuit. The controlling thyristor controls the discharge of the capacitor to reverse bias the measured thyristor.

---

This invention relates to improvements in systems for measuring the turn-off time of a thyristor.

The turn-off time of a thyristor (the time for recovering the forward blocking ability after the shut off of forward current) is one of the important characteristics of a thyristor. The turn-off time of a thyristor varies according to the temperature of the element, the magnitude of forward current, reverse voltage, and reapplied forward voltage, and other circuit conditions. It may be measured by stopping the forward current of previously determined magnitude, immediately applying a reverse voltage of previously determined magnitude, and thereafter reapplying a forward voltage having a predetermined rise time and magnitude. The duration of the interval between the time the forward current is stopped and the time the thyristor refires after the reapplied forward voltage is impressed represents the turn-off time.

A need exists for a simple and reliable measuring circuit for measuring thyristor turn-off time. As subsequently described, prior art measuring circuits tend to be complex and unreliable.

Therefore, an object of this invention is to provide a measuring system for measuring the turn-off time of a thyristor, said system being simple and improved in construction.

Another object of this invention is to provide an improved measuring system for measuring the turn off time of a thyristor in which the later described defects of conventional devices have been removed.

Another object of the invention is to provide a measuring system for measuring the turn-off time of a thyristor having a source of substantially large current capacity for reapplying forward voltage so that the measurement is not affected by residual carriers or other characteristics of the measured thyristor.

For attaining the above described objects according to this invention, there is provided a measured thyristor in a forward current circuit and connected with a control thyristor so that the cathodes of the thyristors are connected in common. A commutating capacitor having an extremely large discharge time constant is connected between the thyristor anodes. The commutating capacitor is connected with a reverse voltage charging circuit and a reapplied forward voltage charging circuit which cancels the reverse voltage charging circuit.

The invention will now be described with reference to the appended drawings, in which.

Figure 1:
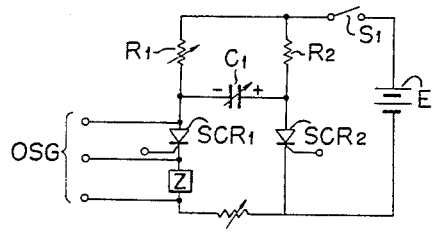
FIG. 1 is a circuit diagram of a prior art measuring system.

FIGURE 1 shows one prior art device for measuring the turn-off time of a thyristor. In FIG. 1, a commutating capacitor C1 is connected between the anodes of a measured thyristor SCR1 whose turn-off time is to be measured and a controlled thyristor SCR2. The capacitor intermittently applies a reverse voltage to SCR1 to turn it off. Briefly illustrating the operation, a switch S1 is closed to apply a forward voltage to SCR1 and a signal is applied to the gate of SCR1 so that SCR1 is rendered conductive. A current flows through a resistance R2 and capacitor C1 and the capacitor is charged thus making the side connected to SCR2 positive as shown in the drawing. Next a signal is applied to the gate of SCR2 causing it to fire. The SCR2 side of the commutating capacitor C1 is grounded and the reverse voltage of the capacitor C1 is applied to SCR1. The capacitor C1 discharges current through SCR2 and is charged in the reverse direction through a resistance R1. If the time constant of C1 R1 is larger than a fixed value, SCR1 is reversely biased until after it has recovered its forward blocking ability so that SCR1 is turned off. An oscillograph OSG is connected in parallel with the measured thyristor SCR1 for monitoring the turn-off characteristics. The reverse bias time is altered by making C1 and R1 variable. The reverse bias time is gradually shortened until a limit is reached such that the measured thyristor SCR1 refires during the charging of C1 through R1. The limit is indicated by the oscillograph as the turn-off time.

Figure 2:
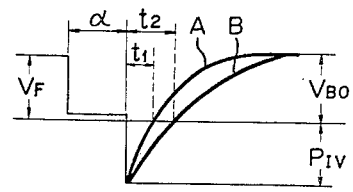
FIG. 2 is a diagram showing the wave form of the voltage between the anode and cathode of SCR1 of FIG. 1.

FIG. 2 shows wave forms illustrating the operation of SCR1 of FIG. 1. VF is the forward voltage applied by closing switch S1. PIV is the reverse voltage applied when SCR2 is fired and VBO is the reapplied forward voltage. α is the duration of the forward current. The intervals t1 and t2 are the turn-off times of two typical SCR's A and B, t1 corresponding to the turn-off time of an element A having a short turn-off and t2 corresponding to the turn-off time of an element B having a long turn-off time. While this prior art system is one of the simplest for measuring turn-off time it has limited use since the wavefront of the reapplied forward voltage is nonlinear and varies for the different turn-off times of the thyristors being measured.

Figure 3:
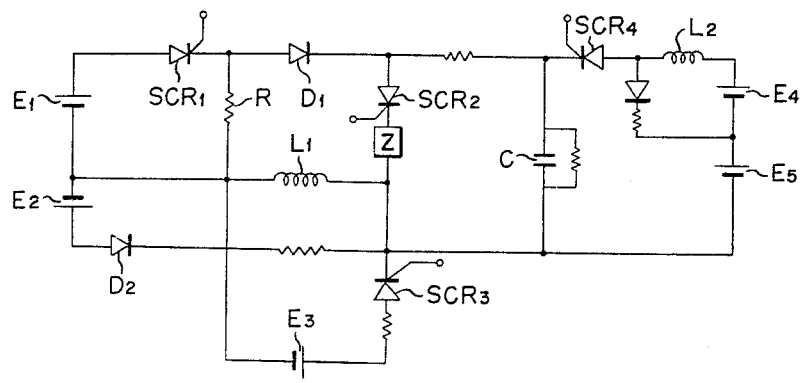
FIG. 3 is a circuit diagram of another prior art measuring system.

FIG. 3 shows another conventional turn-off time measuring circuit. It operates as follows. Initially the thyristor SCR1 and measured thyristor SCR2 are both fired and forward current flows from E1 through SCR1, D1, SCR2 and L1. After about 50 microseconds, a thyristor SCR3 is fired thus causing a reverse voltage E3 to be applied to the measured thyristor through a resistor R and a diode D1. The reverse voltage cuts off SCR2.

Figure 4:
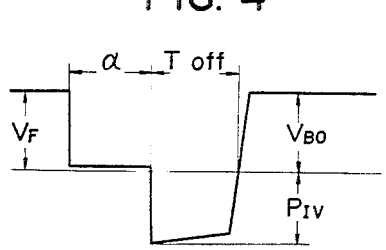
FIG. 4 is a diagram showing the wave form of the voltage between the anode and the cathode of SCR2 of FIG. 3.

Next, a signal is applied to the gate of thyristor SCR4 and as SCR4 fires a forward voltage is applied to SCR2 from the direct current source E5. The forward current of the measured thyristor SCR2 is controlled by a current which always flows from direct current supply E2 through reactor L1. The magnitude of reapplied forward voltage applied to thyristor SCR2 is controlled by the direct current supply E5 and its rise time is determined by the capacitance of capacitor C and a current which always flows from E4 through L2. To determine the turn-off time, the time between the stoppage of forward current and the reapplied forward voltage is decreased gradually until the limit is reached at which the measured thyristor refires. The wave form of voltage between the anode and the cathode of SCR2 in this circuit is shown in FIG. 4. This circuit arrangement has advantages because the magnitudes of the forward current, reverse voltage, reapplied forward voltage, and the rate of rising up are all independently adjusted. However, in order to apply a reverse voltage correctly to the measured thyristor the diode D1 in the circuit must have a larger residual carrier than the measured thyristor SCR2, and it must be in a completely blocked condition at the time when the reapplied forward voltage is applied thereto. It is extremely difficult to meet these exact conditions in actual practice. Furthermore, the diode D1 must frequently be changed in order to meet these conditions when the measured thyristor SCR2 is changed. When the residual carrier holding time is smaller than the residual carrier holding time of the measured thyristor SCR2, the reverse voltage applied to the measured thyristor SCR2 is attenuated to near zero before the reapplied forward voltage is applied, and when the residual carrier holding time of the diode D1 is larger than residual carrier holding time of the measured thyristor SCR2, a distortion occurs because a current flows into the diode D1 from the reapplied forward voltage source in order to absorb the resulting residual carrier of the diode. These phenomena appear quite markedly when the turn-off time of the measured thyristor SCR2 is small, and they result in completely erroneous indications when the element being tested has a turn-off time of a few microseconds.

The present invention eliminates disadvantages such as those described above and will now be described in connection with the embodiment shown in FIG. 5.

Figure 5:
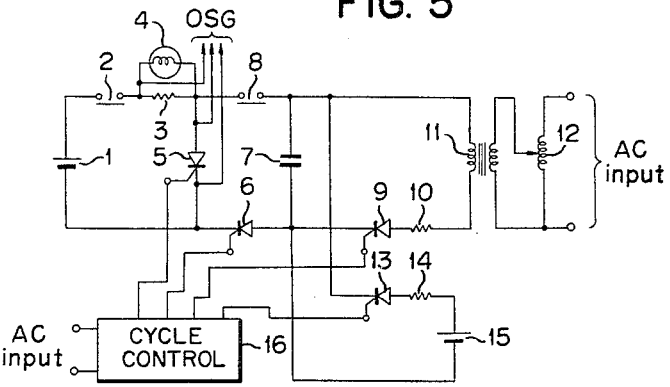
FIG. 5 is a circuit diagram of a measuring system according to this invention.

Referring now to FIG. 5, this turn-off time measuring system includes the measured thyristor or silicon controlled rectifier 5 which is connected to a forward current feed circuit including a direct current source 1, contacts 2, and a load resistance 3. There is provided a control thyristor 6, the cathode of which is connected to the cathode of the measured thyristor. A commutating capacitor 7 is connected in series with contacts 8 between the anodes of these thyristors. The capacitor 7 is connected to two charging circuits, one including a thyristor 9, an isolation transformer 11, and a voltage regulator 12, and the other including a direct current source 15, a current limiting resistance 14, and another thyristor 13. The thyristors are all fired by signals from a thyristor control circuit 16. Contacts 2 and 8 are contacts associated with the thyristor overload protection relay 4.

The operation of this circuit is as follows. An alternating current is applied to voltage regulator 12 thus causing a predetermined reverse voltage to be charged on the capacitor 7 through the isolation transformer 11, current limiting resistance 10, and thyristor 9. The thyristor control circuit 16 is responsive to the alternating current source and operates in synchronism with the source. Next, the measured thyristor 5 is fired by the thyristor control circuit 16. Assuming contacts 2 are closed, a forward current flows from the direct current source 1 through the load resistance 3 to the measured thyristor. After a fixed time (in actual practice about 50 sec.) thyristor 6 is fired by the control circuit 16 and the reverse voltage from the capacitor 7 is applied to thyristor 5. The forward current through thyristor 5 stops when the reverse voltage is applied. Since the reverse voltage waveform is determined by the time constant of the capacitor 7 and the limiting resistor 3, said time constant is selected large enough so that the reverse voltage is held substantially constant during the turn-off period of thyristor 5. Subsequently when the thyristor 13 is fired by control circuit 16 capacitor 7 is charged in the reverse direction from the previous charge. The charging current comes from direct current source 15 through the current limiting resistance 14. It should be noted that in this system the current from source 1 adds to the current resulting from the reapplied forward voltage from source 15. The rise time of this reapplied forward voltage is determined mainly by the time constant of the capacitor 7 and current limiting resistor 14. When the reapplied forward voltage applied upon the measured thyristor 5 becomes equal to the direct current source 1, thyristors 6 and 13 turn-off naturally. The adjustment of the phase or timing of the reapplied forward voltage is performed by controlling the firing phase of the thyristor 13. The turn-off time is determined by varying the firing time of thyristor 13 until a limit is reached where refiring of measured thyristor 5 occurs in response to the reapplied forward voltage. The turn-off time may be indicated by means of a synchroscope or a vernier dial.

The turn-off time measuring circuit of FIG. 5 is very simple, and the problem of residual carriers of the diode used as the circuit element in the prior art circuit of FIG. 3 is avoided. Also, the problem of the variation of the rise time as discussed in connection with FIG. 1 is avoided so that an accurate measurement of the turn-off time is possible.

Figure 6:
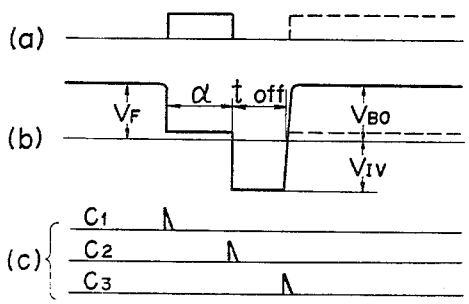
FIG. 6 is a diagram of the wave forms of voltages and currents at various points in FIG. 5.

FIG. 6 shows waveforms for the circuit of FIG. 5. Waveform (a) is the waveform of the forward current of the measured thyristor 5, with the dotted line representing the forward current at the refiring, (b) is the voltage wave of the anode cathode voltage of the measured thyristor 5, with VF representing the forward voltage, VIV representing the backward voltage, VBO representing the reapplied forward voltage, α representing the conducting period, and (t off) representing the turn-off period. The dotted line represents conduction at the refiring period. Waveforms (C) represent the output pulse phase relations of the thyristor control circuit 16, with (C1) representing the firing pulse wave form of the measured thyristor 5, (C2) representing that of the reverse voltage thyristor 6, and (C3) representing that of the reapplication forward voltage thyristor 13.

What is claimed is:

1. In a system for measuring the turn-off time of a first thyristor having a cathode and anode, the combination comprising:

a forward current cricuit connected to the cathode and anode of said first thyristor;

a second thyristor having a cathode and anode;

means connecting the cathodes of said first and second thyristors in common;

a capacitor connected between the anodes of said first and second thyristors;

a reverse voltage charging circuit responsive to control signals and connected to said capacitor for charging said capacitor in one direction;

a forward voltage charging circuit responsive to control signals and connected to said capacitor for charging said capacitor in the opposite direction;

and cycle control means for applying control signals in sequence to said reverse voltage charging circuit, said first thyristor, said second thyristor, and then said forward voltage charging circuit whereby the turn-off time of said first thyristor is equal to the minimum time between the control signals applied to said second thyristor and said forward voltage charging circuit that will not cause refiring of said first thyristor, said first thyristor being fired by the control signal applied thereto by said cycle control means and turned off by reverse voltage from said capacitor when said second thyristor receives a control signal.

2. The combination as claimed in claim 1 wherein said forward current circuit comprises a current source and a resistor connected in series between the cathode and anode of said first thyristor, said capacitor and said resistor forming a discharge circuit having a time constant which is larger than the turn-off time of said first thyristor.

3. The combination as claimed in claim 2 wherein said reverse voltage is applied as a backward bias on said first thyristor when said second thyristor receives a control signal from said control means, and said forward voltage charging circuit comprises a second current source, a second resistor, and a third thyristor connected in series, said third thyristor having a cathode which is connected to a point intermediate said capacitor and the anode of said first thyristor so that a forward bias voltage is applied to said first thyristor as said capacitor is charged in said opposite direction.

4. The combination as claimed in claim 3 wherein each of said thyristors is a silicon controlled rectifier having a gate electrode connected to receive control signals from said cycle control means, said cycle control means including means for varying the time of occurrence of the control signals applied to said third thyristor.

5. The combination as claimed in claim 4 wherein said reverse voltage charging circuit includes a further silicon controlled rectifier having a cathode connected to a point intermediate said capacitor and the anode of said second thyristor, a gate electrode controlled by said cycle control means, and an anode connected to a voltage source.

References Cited

Direct Current, "Turn-off Time of Silicon Controlled Rectifiers" (Dyer et al.), June 1962, pp. 158–165.

RUDOLPH V. ROLINEC, Primary Examiner

E. L. STOLARUN, Assistant Examiner